(12) United States Patent
Trapani

(10) Patent No.: US 8,184,161 B2
(45) Date of Patent: May 22, 2012

(54) METHOD AND SYSTEM FOR VEHICLE-MOUNTED RECORDING SYSTEMS

(76) Inventor: Carl E. Trapani, Las Vegas, NV (US)

( * ) Notice: Subject to any disclaimer, the term of this patent is extended or adjusted under 35 U.S.C. 154(b) by 370 days.

(21) Appl. No.: 12/632,922

(22) Filed: Dec. 8, 2009

(65) Prior Publication Data

US 2010/0085431 A1  Apr. 8, 2010

Related U.S. Application Data

(62) Division of application No. 11/022,117, filed on Dec. 23, 2004, now abandoned.

(51) Int. Cl.
*H04N 7/12* (2006.01)
(52) U.S. Cl. ........................................ 348/148; 348/143
(58) Field of Classification Search .................. 348/143, 348/148
See application file for complete search history.

(56) References Cited

U.S. PATENT DOCUMENTS

| | | | |
|---|---|---|---|
| 4,807,024 A * | 2/1989 | McLaurin et al. ............ 348/50 |
| 5,712,679 A | 1/1998 | Coles | |
| 5,717,379 A | 2/1998 | Peters | |
| 6,211,907 B1 | 4/2001 | Scaman et al. | |
| 6,636,256 B1 * | 10/2003 | Passman et al. ............ 348/143 |
| 7,697,028 B1 * | 4/2010 | Johnson ........................ 348/148 |
| 2001/0010541 A1 | 8/2001 | Fernandez et al. | |
| 2002/0145666 A1 | 10/2002 | Scaman et al. | |
| 2003/0053536 A1 | 3/2003 | Ebrami | |
| 2003/0067541 A1 | 4/2003 | Joao | |
| 2003/0071898 A1 | 4/2003 | Henderson et al. | |
| 2003/0076415 A1 | 4/2003 | Strumolo | |
| 2003/0128275 A1 | 7/2003 | Maguire | |
| 2003/0154009 A1 | 8/2003 | Basir et al. | |
| 2004/0008253 A1 | 1/2004 | Monroe | |
| 2004/0150715 A1 | 8/2004 | Wilcock et al. | |
| 2009/0079839 A1 * | 3/2009 | Fischer et al. ............ 348/218.1 |

* cited by examiner

*Primary Examiner* — Jay Au Patel
*Assistant Examiner* — Geepy Pe
(74) *Attorney, Agent, or Firm* — Weiss & Moy, P.C.; Jeffrey D. Moy

(57) ABSTRACT

A method for acquiring surveillance data corresponding to a region of interest comprising: installing a plurality of vehicle-mounted recording system on a plurality of vehicles; capturing visual data of exterior perimeters of the vehicles having vehicle-mounted recording systems when the vehicles are in motion wherein the visual data is marked with location data and time data; storing the visual data, the location data, and the time data so that each portion of the visual data is locatable by at least one of a time of video data capture and a location of video data capture; transmitting a request for recorded surveillance data corresponding to a region of interest; receiving a reply transmission to the request for recorded surveillance data, the reply transmission comprising surveillance data corresponding to at least a portion of the region of interest recorded by at least one of the vehicle-mounted recording systems.

8 Claims, 7 Drawing Sheets

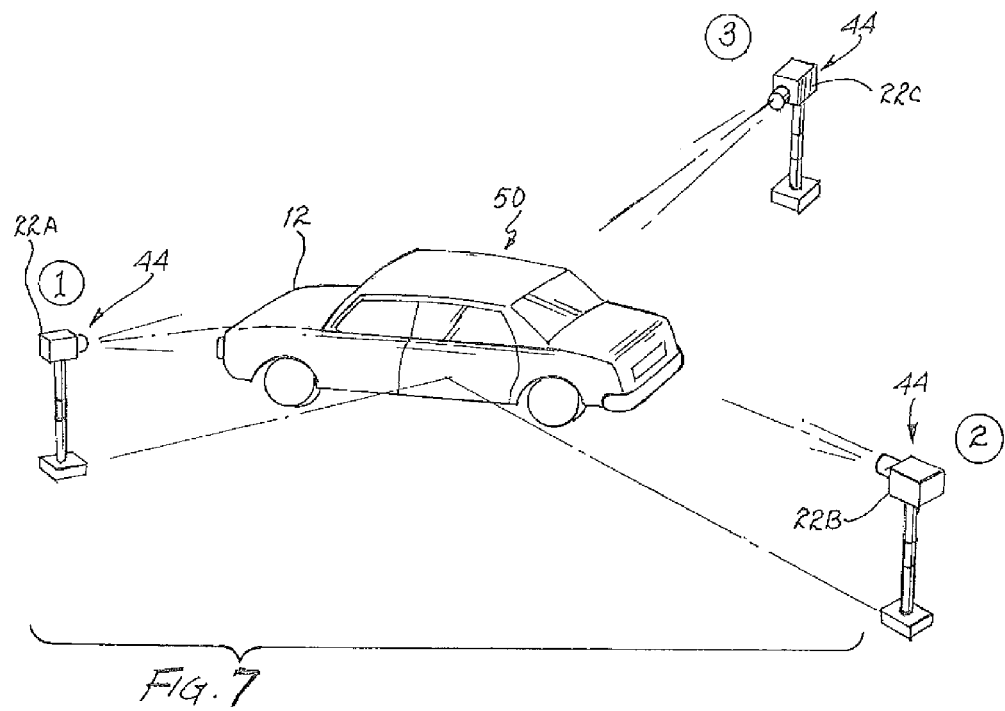
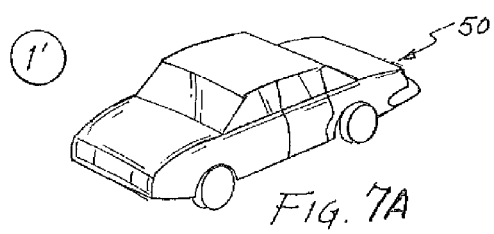
FIG. 7
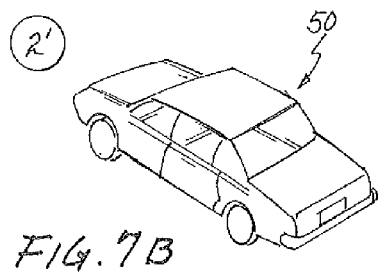
FIG. 7A
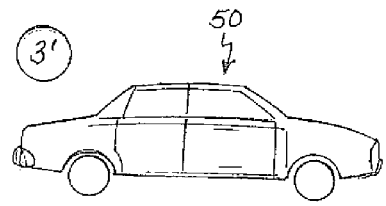
FIG. 7B  FIG. 7C

METHOD AND SYSTEM FOR VEHICLE-MOUNTED RECORDING SYSTEMS

RELATED APPLICATIONS

The present application is a divisional of U.S. patent application filed Dec. 23, 2004, having Ser. No. 11/022,117, now abandoned entitle "METHOD AND SYSTEM FOR VEHICLE-MOUNTED RECORDING SYSTEM", and filed in the name of the same inventor.

BACKGROUND OF THE INVENTION

1. Field of the Invention

The present invention relates generally to vehicle-mounted recording systems, and more specifically, to a method and system for transmitting, receiving, and reproducing recorded information from vehicle-mounted recording systems.

2. Background of the Invention

Advances in technologies relating to image capture, computing power, memory storage, and wireless communications have enabled technologies such as Global Positioning System (GPS), efficient video compression and decompression, and wireless data transfer. Recent developments benefiting from these and other advances include wireless internet connectivity, handheld high-resolution digital video cameras with significant memory, and world-wide cellular connectivity.

In regard to public safety, law enforcement and homeland security concerns have triggered the ever-increasing installation of surveillance equipment such as on ATMs, buildings, and traffic signals. Although such increased surveillance serves as a deterrent to crime and increases the probability that recorded evidence may be obtained when a crime or act of terror occurs, several problems may be encountered.

Installation, recording, and accessing various surveillance systems may be prohibitively expensive. In addition, searching and retrieving recorded data from multiple independent surveillance systems can be costly and time-consuming. Also, stationary surveillance systems are inherently inefficient because multiple systems must be installed to provide coverage over multiple locations, even though each location may encounter periods of little or no activity when other locations exhibit periods of high activity. For example, crime activity in a downtown area may peak during late night hours while highway accidents may peak during morning and evening rush hours. In order to provide surveillance to cover both peak highway accidents and peak downtown crime activity, cameras must be installed in both locations, even though the surveillance may be expected to be minimally useful during off-peak hours, such as downtown during rush hour, or on the highways during late night hours. Furthermore, using retrieved surveillance data from multiple systems to generate a coherent view of an event such as crime may be prohibitively expensive or difficult.

Therefore, it would be desirable to provide a method and system that provides all of the benefits of present surveillance systems with none of the drawbacks.

It is an object of the present invention to provide a surveillance system that varies surveillance coverage with changing population density.

It is another object of the present invention to provide an efficient method of retrieving surveillance data of interest.

It is yet another object of the present invention to provide an efficient method of reconstructing an event from data recorded by multiple recording sources.

It is still another object of the present invention to provide a surveillance network where the cost of installing monitoring equipment is transferred to consumers.

SUMMARY OF THE INVENTION

The above objectives are achieved in a method and system for vehicle-mounted recording systems.

In accordance with one embodiment of the present invention, a method for acquiring surveillance data corresponding to a region of interest recorded by vehicle-mounted recording systems is disclosed. It includes the steps of transmitting a request for recorded surveillance data corresponding to the region of interest, and receiving a reply transmission to the request for recorded surveillance data. The reply transmission includes surveillance data corresponding to at least a portion of the region of interest recorded by a vehicle-mounted recording system.

In accordance with another embodiment of the present invention, a method for receiving surveillance data corresponding to a region of interest from vehicle-mounted recording systems is disclosed. It includes the steps of transmitting a polling request containing information corresponding to the region of interest, and receiving a reply transmission to the polling request from a vehicle-mounted recording system having recorded data corresponding to the polling request. The reply transmission to the polling request includes information identifying the vehicle-mounted recording system.

In accordance with yet another embodiment of the present invention, a method for acquiring current surveillance data corresponding to a region of interest relating to an ongoing event of public concern is disclosed. It includes the steps of transmitting a request having information corresponding to the region of interest, and receiving a transmission having surveillance data from a vehicle-mounted recording system within the region of interest.

In accordance with still another embodiment of the present invention, a method for reconstructing an event of public concern is disclosed. It includes the steps of acquiring first data from a first recording source where the first data has first video data depicting a portion of the event, first location data recording a location of the first recording source, and first time data corresponding to the first video data, acquiring second data from a second recording source where the second data has second video data depicting a portion of the event, second location data recording a location of the second recording source, and second time data corresponding to the second video data, synchronizing the first data and the second data in conformity with the first time data and the second time data, and generating a viewable reproduction of the event.

In accordance with yet still another embodiment of the present invention, a vehicle-mounted recording system is disclosed. It has a memory for storing program instructions and data, a processor coupled to the memory for executing the program instructions, a camera coupled to the processor for capturing visual data, locating means coupled to the processor for acquiring location data, timing means coupled to the processor for acquiring time data, and an antenna coupled to the processor for sending and receiving transmissions. The program instructions include instructions for storing the visual data, the location data, and the time data so that each portion of the visual data is locatable by at least one of a time of video data capture and a location of video data capture, searching at least one of the stored time data and the location data in response to receiving a transmission designating a region of interest, and sending a transmission in response to the searching.

The foregoing and other objectives, features, and advantages of the invention will be apparent from the following more particular, description of the preferred embodiment of the invention, as illustrated in the accompanying drawings.

BRIEF DESCRIPTION OF THE DRAWINGS

FIG. 7 is a perspective view illustrating an event captured by recording sources at separate locations in accordance with an embodiment of the invention.

FIG. 7A is a perspective view depicting the event of FIG. 7 as recorded by recording source (1) of FIG. 7.

FIG. 7B is a perspective view depicting the event of FIG. 7 as recorded by recording source (2) of FIG. 7.

FIG. 7C is a perspective view depicting the event of FIG. 7 as recorded by recording source (3) of FIG. 7.

DETAILED DESCRIPTION OF THE PREFERRED EMBODIMENTS

Figure 1:
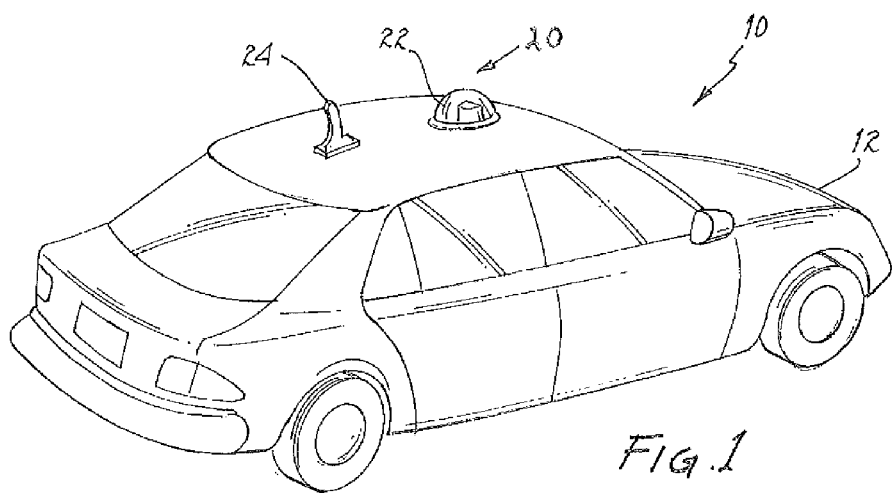
FIG. 1 is a perspective view of a vehicle-mounted recording system with which embodiments of the invention may be practiced.

Referring now to the figures and in particular to FIG. 1, a vehicle 12 having a vehicle-mounted recording system 20 for capturing and storing surveillance data is depicted in accordance with an embodiment of the present invention 10. The vehicle-mounted recording system 20 includes a camera system 22 for capturing visual data and an antenna 24 for sending and receiving transmissions. Although FIG. 1 depicts a vehicle-mounted recording system mounted to a car 12, any type of vehicle may be used, including but not limited to trucks, busses, motorcycles, boats, airplanes, and the like.

Figure 2:
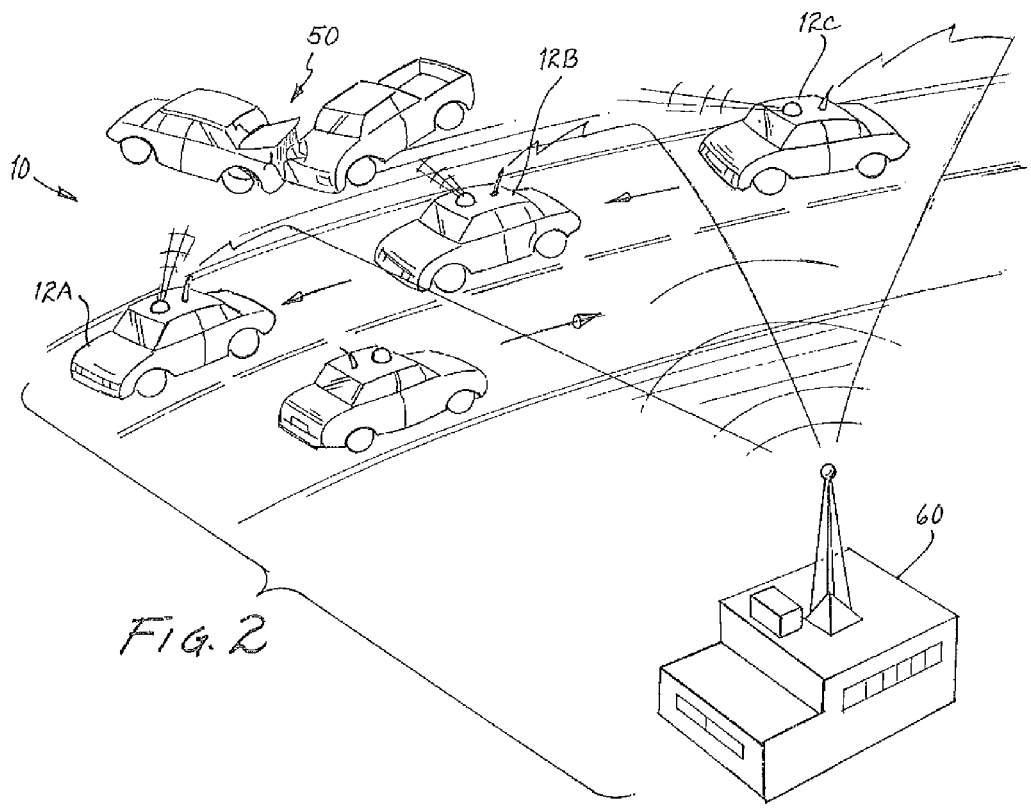
FIG. 2 is a perspective view of a system having a control center and the vehicle-mounted recording systems of FIG. 1 in which embodiments of the invention may be practiced.

Turing now to FIG. 2, an operation of the present invention 10 is depicted. Vehicles 12A, 12B, 12C are each equipped with a vehicle-mounted recording system 20. Each vehicle's vehicle-mounted recording system 20 captures and records surveillance data including an event of interest 50, depicted as an automobile accident. A control center 60 comprising an antenna and a computer coupled to the antenna transmits a query for information relating to the event of interest 50. The vehicle-mounted recording systems 20 for each vehicle 12A, 12B, and 12C receives the query, recognizes that it has captured requested video information corresponding to the event of interest 50, and transmits information back to the control center 60. Although the transmissions are depicted in FIG. 2 as occurring while each vehicle 12A, 12B, 12C is in proximity to both the control center 60 and the event of interest 50, it should be clearly understood that because the captured surveillance data concerning the event of interest 50 is recorded by each vehicle-mounted recording system 20, the transmissions need not coincide with proximity to either the event of interest 50 or the control center 60.

Figure 3:
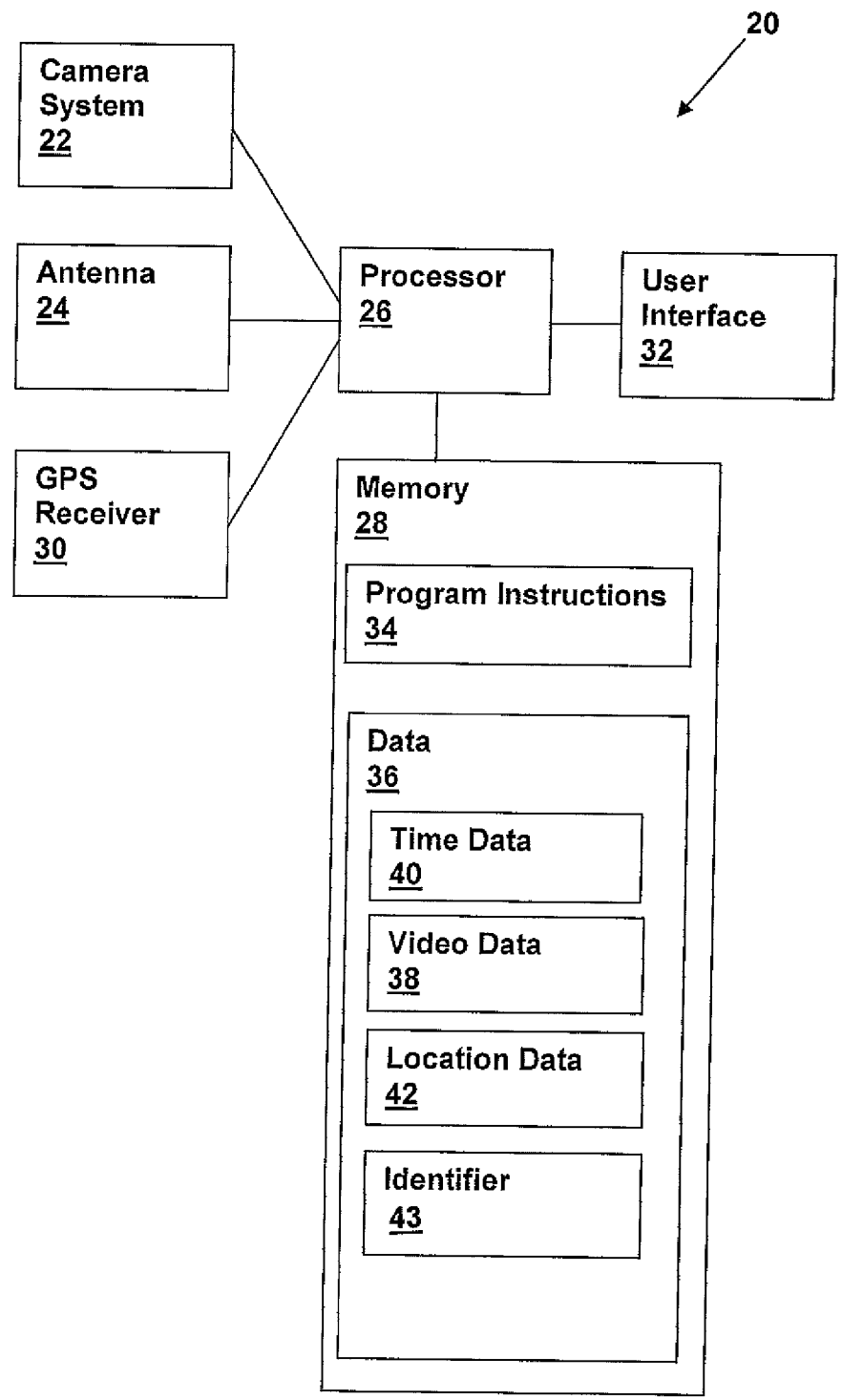
FIG. 3 is a block diagram of components of a vehicle-mounted recording system in which embodiments of the invention may be practiced.

FIG. 3 depicts components of a vehicle-mounted recording system 20 in a block diagram in accordance with an embodiment of the present invention 10. A processor 26 for executing program instructions 34 is coupled to a camera system 22, an antenna 24, a Global Positioning System (GPS) receiver 30, and memory 28. Memory 28 stores program instructions 34 and data 36. The camera system 22 captures surveillance data in the form of video data 38. The GPS receiver 30 captures time data 40 and location data 42. The antenna 24 is used to send and receive transmissions.

Preferably, camera system 22 is roof-mounted video camera system capable of capturing video data in substantially all directions. Camera system 22 may be a single camera using a lens or reflector, or system of lenses or reflectors, to attain a 360.degree. or semi-spherical field of view. However, the desired 360.degree. view of camera system 22 may be accomplished by other arrangements, for example: using multiple video cameras fixed to record in separate directions; or one or more rotating cameras so that a 360.degree. view is recorded each revolution, or partial revolution for multiple rotating cameras. Although it is preferred that camera system 22 record a 360.degree. view, it should be understood that certain benefits may be obtained by not having a 360.degree. view, as long as surveillance data is captured. For example, camera system 22 may be a single forward-mounted camera, or one forward-mounted and one rearward-mounted camera. Additionally, although it is preferred that camera system 22 includes a video camera, it is within the spirit and scope of the present invention that camera system 22 capture still images to reduce cost and decrease memory usage. It is envisioned that camera system 22 may also alternate between video and non-video image capture, such as by capturing periodic still images when the vehicle 12 is not in use and video images when the vehicle 12 is traveling.

In addition to video data 38, time data 40 and location data 42 are captured by the GPS receiver 30 and stored in memory 28. However, it is within the spirit and scope of the present invention that GPS receiver 30 not be used, as long as accurate location data 42 and time data 40 are obtained. For example, a cellular network signal may provide time data 40 and also provide location data 42 via cellular triangulation. Other methods of obtaining the location data 42 include but are not limited to computing location from radio signal strength from known transmitter locations, for example, or air-traffic beacons, or from any other signal transmitters or combination of transmitters, whether provided specifically for the practice of the present invention of for other purposes. Furthermore, rather than location data 42 being computed by the vehicle-mounted recording system 20, location data may be computed elsewhere and then provided to the vehicle-mounted recording system 20, such as with a triangulation based on transmission signal strength received at multiple receivers, or may be computed via satellite imaging, or computed by the vehicle-mounted recording system 20 based on speed, direction, and time of travel from a known location such as an operator's garage or other stationary location. Similarly, time data 40 may be obtained by receipt of a signal or transmission containing time data, or through an accurate clock on the vehicle 12 itself; or any combination of remote and local time data 40 sources.

Preferably, the video data 38, time data 40 and location data 42 are stored so that each portion of the video data 38 is locatable by the time of the video data 38 capture or by the location of the video data 38 capture. This may be accomplished by periodically or continuously acquiring a current time and location and saving the data concurrently with the video data 38 as a time- and location-stamp. Other methods include, but are not limited to, storing video data 38 independent of location data 42 and time data 40, and maintaining a table of cross-references mapping the time data 40 and location data 42 to the video data 38, or by time-stamping each of the video data 38 and the location data 42.

Preferably, memory 28 has sufficient capacity to store several days' data 36, although the storage capacity will vary according to image quality, video storage and compression techniques, and memory device manufacturing capabilities. Video compression technologies may be employed to increase effective capacity. Preferably, memory 28 is a standard high-capacity drive or array of drives functioning as a circular memory with the most recently captured data 36 overwriting the oldest saved data 36. However, any method of storage may be used as long as the desired duration of storage (e.g. 5 days' worth) is maintained.

Program instructions may also be included to retain certain portions of data beyond the normal time period, such as when the data 36 is pertinent to an ongoing investigation requiring strict evidentiary controls. The pertinent data may by retained until properly copied, removed, recorded, or processed as required.

Of course, all data may be permanently stored if desired, such as by recording on a CD-ROM or other permanent memory media. Data transmission to a permanent storage device may occur wirelessly via the antenna 24 or by a physical connection such as a cable to not interfere with the receipt of incoming transmissions.

When a transmission is received designating a region of interest, the vehicle-mounted recording system 20 searches the stored time data 40 or location data 42 to ascertain whether the stored memory corresponds with the region of interest. For example, the region of interest may define of a spatial region only, such as a rectangular region specified by latitude and longitude boundaries or a circular region defined within a distance from a particular point. In this example, only location data 42 need be searched to find if any portion of the location data 42 falls within the spatial region, i.e., if any video data 38 was recorded while the vehicle was in the spatial region of interest. As another example, the region of interest may only define a temporal region, such as a time period of the present day or a past day. In this example, only time data 40 need be searched to find if any portion of the time data 40 falls within the temporal region, i.e., if any video data 38 was recorded during the specified time. As a third, more likely example, the region of interest may define both a temporal and a spatial region. In this example, both the time data 40 and location data 42 may be searched to find if any video data 38 was recorded while the vehicle was both present in the area of and during the time period defined by the region of interest.

A transmission may be sent in response to the searching. For example, if the search results indicate that the vehicle was present within the region of interest, the video data 38 recorded during the region of interest may be transmitted. The transmission may consist of other information such as a negative search result response, or an authorization query to verify the source of the original transmission.

Preferably, the vehicle-mounted recording system 20 continually operates independently of operation of the vehicle 12. Because it is not known when a significant event will happen, the vehicle-mounted recording system 20 should continue to operate even when the vehicle 12 is not running. In this manner, events occurring around the vehicle 12 are continually recorded, including theft or vandalism of the vehicle 12 itself, thereby serving as a crime deterrent. In addition, continual operation allows the immediate receipt of transmissions, searching of stored data, and transmission of responses, to the benefit of law enforcement, homeland security, or other authorities requesting information.

It should be noted that it is preferred that the vehicle-mounted recording system 20 be capable of simultaneously recording data 36 and performing other operations such as searching and retrieving stored data 36. This may be accomplished through techniques known to those of skill in the art, such as using multiple heads for reading and writing to memory, or using disk mirroring, as examples. Power for the continual operation may come from the battery of the vehicle 12 or an alternate power source may be provided. As an example, a separate battery may be charged while the vehicle is in use and used to power the vehicle-mounted recording system 20 when the vehicle is not running to conserve the battery of the vehicle 12.

Preferably, the vehicle-mounted recording system 20 executes the program instructions 24 automatically so that an owner or operator of the vehicle 12 has no knowledge of the operation of the system. Thus, a degree of detachment, non-involvement, and anonymity may be achieved by vehicle 12 owners without depriving law enforcement or other authorities of important evidence or other information of interest.

Returning to FIG. 3, the vehicle-mounted recording system 12 preferably further includes a user interface 32 coupled to the processor 26 for exchanging information with an operator of the vehicle 12. However, it should be understood that certain benefits may be obtained without having user interface 32, so that the vehicle-mounted recording system 20 operates autonomously, i.e., without any exchange of information with an operator of the vehicle 12.

Preferably, the vehicle-mounted recording system 12 includes a unique identifier 44. Although depicted as data 36 in memory 28, the identifier 44 may not reside in memory 28 and instead be hardwired or physically designated such as with switches or pins. A user may select an anonymity preference using the user interface 32. The unique identifier 44 will be included in transmissions sent by the vehicle-mounted recording device 20 in conformity with the selected anonymity preference. For example, if a user selects a non-anonymous preference, then the unique identifier 44 will be included in transmissions, so that the sender of the transmission will be known. If a user selects an anonymous preference, then the unique identifier 44 will not be included, and the transmission will be effectively anonymous.

Preferably, a user may select through the user interface 32 a transmission selection. The transmission selection may include sending all transmissions automatically, sending no transmissions, and prompting the operator for permission prior to sending a transmission. When a transmission is received, the vehicle-mounted recording system 20 will respond in conformity with the transmission selection. For example, an operator may select a transmission selection to not respond to any received requests for data. If the operator wishes to selectively respond to requests for information, the vehicle-mounted recording system 20 may display each request for information on the user interface 32 and only send a reply transmission with the approval of the operator.

Figures 4, 5:
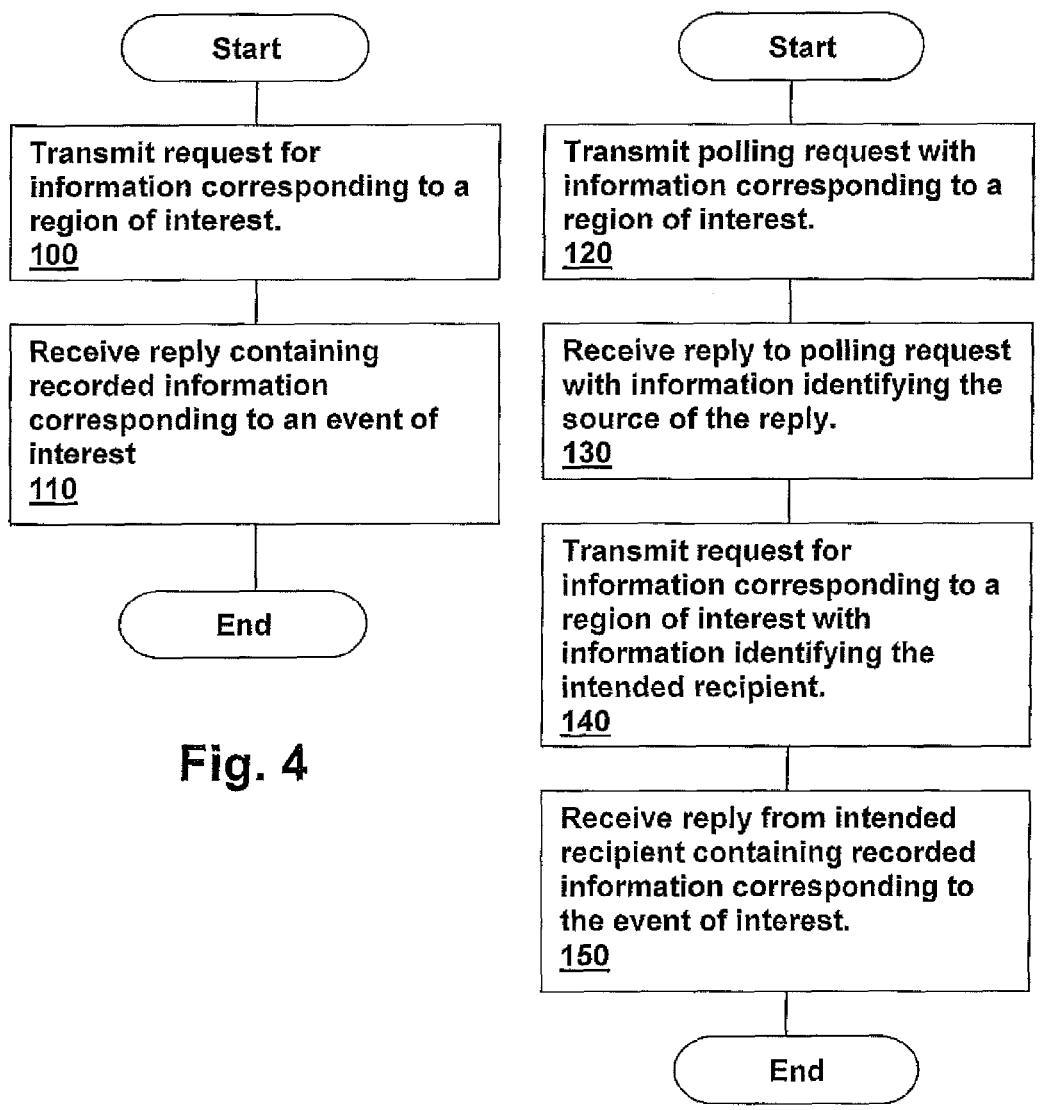
FIG. 4 is a flowchart depicting an operation of a system for retrieving recorded surveillance data in accordance with an embodiment of the present invention.
FIG. 5 is a flowchart depicting an operation of a system for retrieving recorded surveillance data in accordance with another embodiment of the present invention.

Turning now to FIG. 4, a method for acquiring surveillance data corresponding to a region of interest recorded by vehicle-mounted recording systems 20 is depicted in a flowchart in accordance with an embodiment of the present invention 10. The method includes transmitting a request for recorded surveillance data corresponding to the region of interest (step 100). The transmission preferably originates at a control center 60 and may be broadcast from various locations to broaden the area covered by the transmission. A reply transmission to the request for recorded surveillance data is then received that includes surveillance data corresponding to at least a portion of the region of interest recorded by a vehicle-mounted recording system 20 (step 110). Although it is preferred that the reply transmission occurs as a result of the data storage, search, and reply functions of the vehicle-mounted recording system 20 as previously described, any method of generating a reply transmission containing recorded surveillance data corresponding to the region of interest by a vehicle-mounted recording system 20 may be used.

Additionally, any viable method sending and receiving of transmissions may be used, including but not limited to radio, infrared, and microwave, or any combination of methods. Benefits may be obtained by using existing communication systems such as satellite, cellular networks and wireless internet networks. Additionally, any combination of wireless and land-based communications may be employed as desired, for example, a transmission broadcast by a vehicle-based recording system 20 may be received by a receiver and then conveyed via landline to the destination control center 60.

Although it is preferred that the region of interest corresponds to an event 50 concerning public safety such as a crime, vehicular accident, or act of terrorism, the region of interest may correspond to any desired region. Further, although it is preferred that the surveillance data recorded and transmitted by the vehicle-mounted recording systems 20 is video data, it should be understood that the recorded surveillance data may include any type of recordable data including but not limited to audio, sonar or radar signals, temperature, barometric pressure, particulate atmospheric content, participation, or any combination of surveillance data types that are recorded.

Turning now to FIG. 5, a method for receiving surveillance data corresponding to a region of interest recorded by vehicle-mounted recording systems 20 is depicted in a flowchart in accordance with another embodiment of the present invention 10. A polling request having information corresponding to the region of interest is transmitted (step 120). A reply transmission is received from a vehicle-mounted recording system 20 having recorded data corresponding to the polling request (step 130). The reply transmission contains information identifying the vehicle-mounted recording system 20. The identifying information may be a unique identifier 44 or other identifying information, such as a cellular number assigned to the vehicle-mounted recording system 20.

Recorded surveillance data corresponding to at least a portion of the region of interest is then retrieved from the identified vehicle-mounted recording system 20. Preferably, the retrieval is performed by transmitting a request for recorded surveillance data corresponding to the region of interest that includes information identifying the vehicle-mounted recording system 20 (step 130). A reply transmission to the request for recorded surveillance data is then received from the vehicle-mounted recording system 20 (step 140). The reply transmission contains recorded surveillance data corresponding to at least a portion of the region of interest. The transmission requesting recorded data and identifying the intended recipient may be performed by broadcasting the request with the identifying information, so that all recipients must determine whether or not they are the intended recipient of the request. Alternatively, the identifying information may be encompassed in the mode of transmission, for example, if the identifying information is a cellular number, then the request transmission may be a cellular call to the identifying cellular number, and the reply transmission containing recorded surveillance data may similarly occur via the established cellular connection.

Although it is preferred that the recorded surveillance data is retrieved by a transmitted request and reply, certain benefits may be obtained by other methods of retrieving recorded surveillance data. For example, law enforcement officers may physically locate the vehicle 12 and retrieve data corresponding to the region of interest by establishing a physical connection to download data, such as through a USB, serial, or parallel port.

Figure 6:
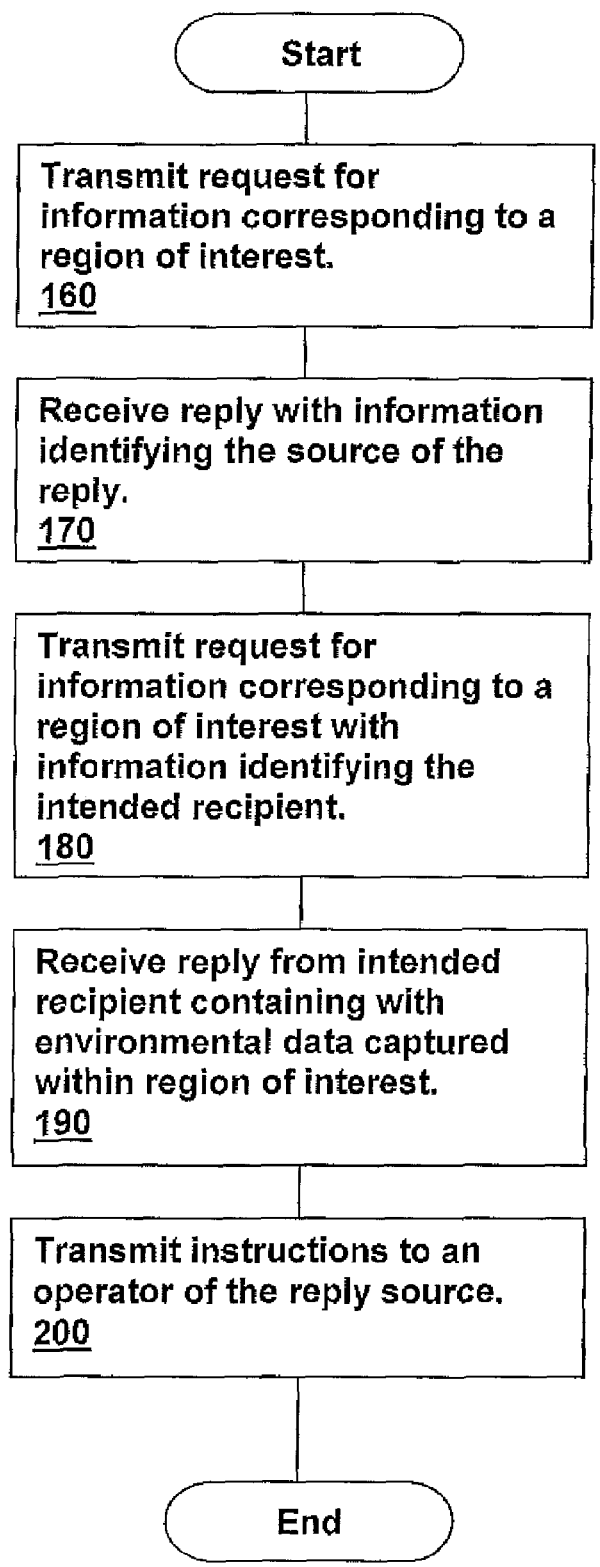
FIG. 6 is a flowchart depicting an operation of a system for retrieving current surveillance data in accordance with still another embodiment of the present invention.

Turning now to FIG. 6, a method for acquiring current surveillance data corresponding to a region of interest relating to an ongoing event 50 of public concern is depicted in a flowchart in accordance with an embodiment of the present invention 10. The method includes the step of transmitting a request having information corresponding to the region of interest (step 160). A reply to the request, transmitted by a vehicle-mounted recoding system 20 within the region of interest and containing information identifying the vehicle-mounted recording system 20 is received (step 170). A request for surveillance data containing the identifying information is transmitted (step 180). A reply transmission containing surveillance data from the identified vehicle-mounted recording system 20 within the region of interest is received (step 190). The surveillance data need not be recorded data: the transmission may be a real-time continual data stream allowing the recipient to view the immediate environment around the identified vehicle 12.

The method preferably further includes the step of transmitting control data for controlling an operation of the identified vehicle-mounted control system 20. Preferably, the control data includes instructions for an operator of the vehicle (step 200). The instructions may be communicated to the vehicle operator via user interface 32 such as with audio instructions or on a video display, requesting the operator comply with the instructions. For example, the instructions may request that the operator follow a fleeing suspect, or move the vehicle to a particular location near the event 50, or to evacuate the region for the operator's safety.

However, the control data need not include instructions for an operator of the vehicle 12. For example, if the vehicle-mounted control system 20 has a camera capable of remote operation, the control data may include commands for rotating, tilting, or zooming functions to acquire better data corresponding to the event 50. As another example, if the vehicle-mounted recording system 12 is integrated with the vehicle controls, the control data may include instructions to override the operator's controls and to control the vehicle 12 remotely. Furthermore, it should be clearly understood that certain benefits may be obtained by not transmitting control data. For example, if a sufficient number of vehicle-mounted control systems 20 are in the region of interest, then sufficient surveillance data may be received by the simultaneous transmissions from multiple vehicle-mounted control systems 20 without further need to transmit control data.

It should be noted that although it is preferred that the transmissions requesting information should reach all vehicle-mounted recording systems 20 that may have recorded information corresponding to the region of interest, it may not be practical to have every query reach every equipped vehicle 12. Most likely, with a sufficient population of vehicles 12 equipped with vehicle-mounted recording systems 20, sufficient information about an event 50 may be obtained from local vehicles 12. In the event that sufficient information is not obtained locally, successive transmissions requesting information may be broadcast to larger and larger regions.

Also, benefits may be obtained by maintaining a database of equipped vehicles 12 within a general region. This database may be populated by periodically transmitting a polling request defining the general region, and simply recording the reply information identifying the respondents. When it has been determined that an event 50 had occurred within a general region, each vehicle-mounted recording system 20 in the general region during the time of interest will be known. Requests for recorded information may be transmitted in the general region accompanied by information identifying the intended recipients. If insufficient information is obtained through the transmission, the region of transmission may be broadened. If the identifying information includes cellular numbers, the identified vehicle-mounted recording systems 20 may be queried directly anywhere cellular coverage exists.

Figure 8:
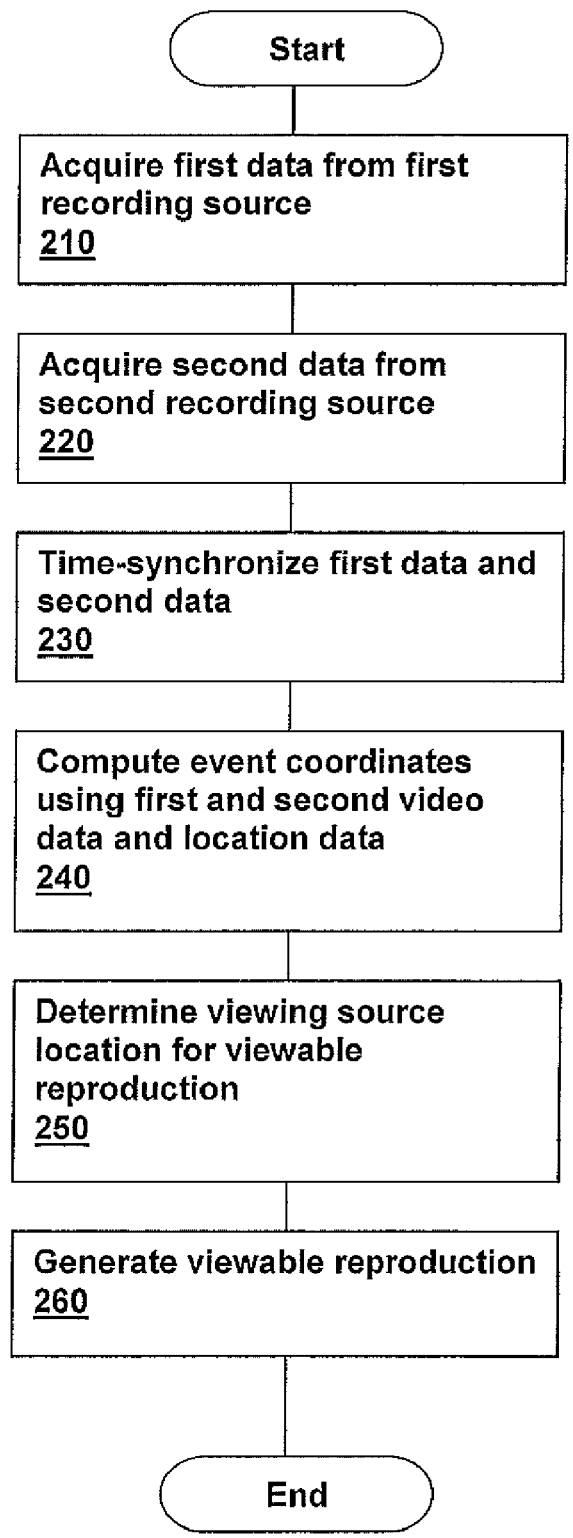
FIG. 8 is a flowchart depicting steps of a method for reconstructing an event from multiple recording sources in accordance with an embodiment of the present invention.
Figure 9:
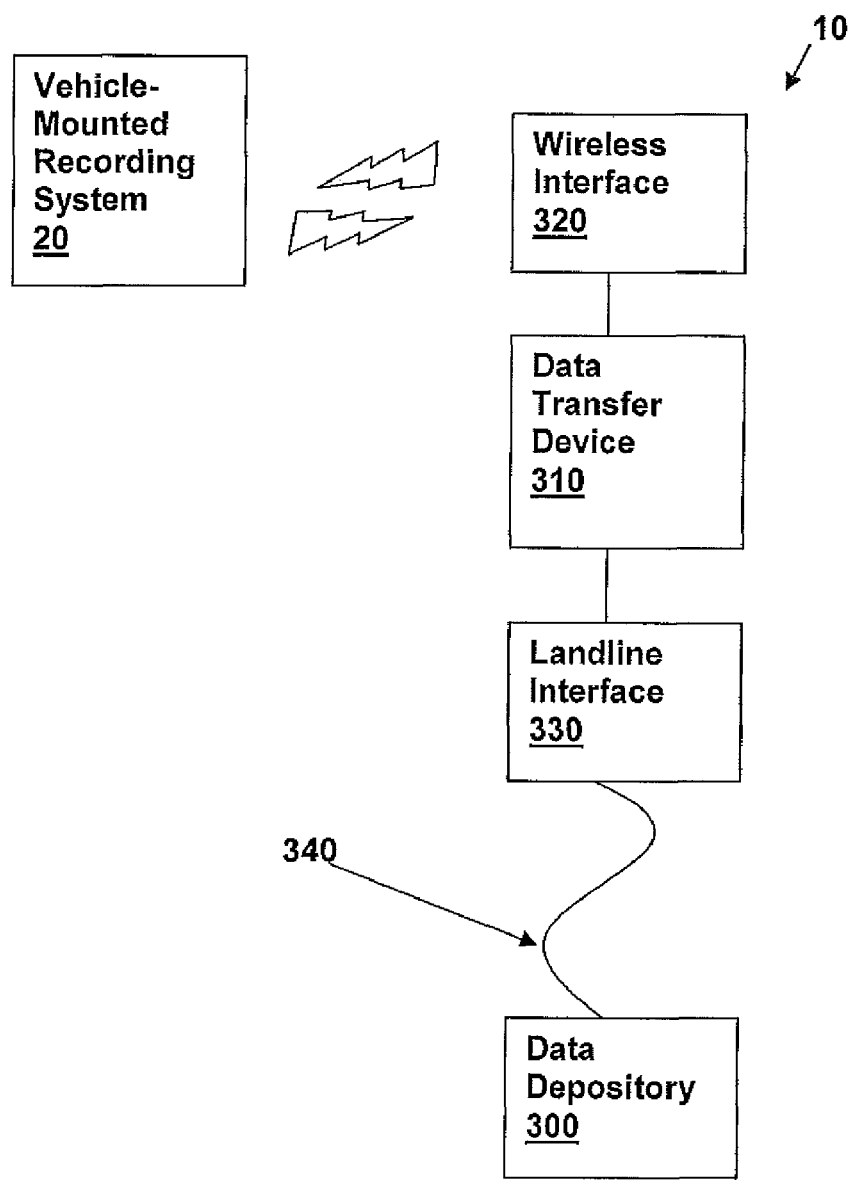
FIG. 9 is a block diagram of components of a data transfer system in which embodiments of the invention may be practiced.

Referring now to FIG. 8, surveillance data recorded by multiple vehicle-mounted recording systems 20 may be periodically downloaded to a data depository 300. Recorded surveillance data is received by a stationary data transfer device 310 from a vehicle-mounted recording system 20 via wireless transmission. The surveillance data that is received is then transmitted to a data depository 300 where it is indexed for searching by recording location or by recording time.

Preferably, the stationary data transfer device 310 is a computer coupled to both a wireless interface 320 and a landline interface 330. When a vehicle-mounted recording system 20 is detected nearby, the stationary computer 310 wirelessly requests surveillance data from the vehicle-mounted recording system 20. Requested surveillance data is wirelessly receiving from said vehicle-mounted recording system 20 via the wireless interface and stored. The stored surveillance data is then transmitted via the landline interface 330.

For example, the stationary data transfer device 310 may a home computer capable of wireless communication with a vehicle having a vehicle-mounted recording system 20 parked in the home garage. The home computer may be programmed to periodically download surveillance data from the vehicle-mounted recording system 20, such as during early morning hours when the vehicle is likely to be garaged and the computer not otherwise used. Following downloading and storing the surveillance, the computer then transfers the surveillance data via landline 340 to a data depository 300, such as by telephone modem connection to a toll-free access number, by cable modem, DSL, or the like. Although it is preferred that the surveillance data be transferred to the data depository 300 soon after receipt from the vehicle-mounted recording system 20, it may be instead be transferred in any desired manner, such as transmitting the data synchronously as it is acquired, or according to a schedule, or when a designated amount of surveillance data has been received, as examples.

The data depository 300 is preferably a very large data storage system capable of permanently storing and indexing all surveillance data from all participating data recording sources. The data depository 300 may exist at a single secured location or consist of several regional locations. The storage and indexing may be performed with techniques well known in the fields of computer science and database administration.

Turning now to FIGS. 7, 7A, 7B, and 7C, a result of receiving recorded surveillance data in the form of video data from multiple recording sources 44A, 44B, and 44C is shown in a perspective illustration. For illustration purposes, recording sources 44A-C are depicted in the form of camera systems 22A, 22B, and 22C capturing information corresponding to an event 50, here depicted as a vehicle 12. Although it is envisioned that each of the recording sources 44A-C is a camera system 22A-C of a vehicle-mounted recording system 20, it is within the spirit and scope of the present invention that one or more recording sources 44A-C be fixed sources, such as a surveillance camera mounted on a building or traffic signal.

FIG. 7A depicts an image of the event 50 captured by recording source 44A at a time $t.sub.0$, FIG. 7B depicts an image of the event 50 captured by recording source 44B at time $t.sub.0$, and FIG. 7C depicts an image of the event 50 captured by recording source 44C at time $t.sub.0$. It will be understood that FIGS. 7-7C depict video capture at a single time for illustrative purposes, and that preferably each vehicle-mounted recording system 22A-C will each capture video data over an extended period of time. In addition, although it is likely that each of the recording sources 44A-C are in motion relative to an event 50 so that the location of the viewing, it is within the spirit and scope of the present invention that any or all of the recording sources 44A-C are not in motion.

Turning now to FIG. 8, steps of a method for reconstructing an event 50 of public concern in accordance with an embodiment are depicted in a flowchart. First data is acquired from a first recording source (step 210), such as recording source 44A of FIG. 7. The first data contains first video data 38 depicting a portion of the event 50, first location data 42 recording a location of the first recording source 44A, and first time data 40 corresponding to the first video data 38.

Also, second data is acquired from a second recording source (step 220), such as recording source 44B of FIG. 7. The second data contains second video data 38 depicting a portion of the event 50, second location data 42 recording a location of the second recording source 44A, and second time data 40 corresponding to the second video data 38. It should be clearly understood that the terms "first" and "second" are used solely to distinguish between the elements of step 210 and step 220 and should not be interpreted to set forth or otherwise restrict the sequence of or relationship between any steps of the present embodiment.

The method further includes the steps of synchronizing the first data and the second data in conformity with the first time data 40 and the second time data 40 (step 230), and generating a viewable reproduction of the event 50. Although each set of video data 38 independently allows a viewable reproduction of the event 50 from the perspective of each recording source 44, the time-synchronization of video data 38 and location data 42 from multiple sources enables generation of viewable reproductions of the event 50 from one or more viewing source locations that do not correspond to actual recording source locations.

Preferably, generating a viewable reproduction of the event 50 is accomplished by computing a plurality of coordinates corresponding to at least a portion of the event 50 in conformity with the first video data 38, second video data 38, first location data 42 and second location data 42 (step 240). At least one viewing source location for the viewable reproduction is determined (step 250), and the viewable reproduction is displayed corresponding to the viewing source location in conformity with the viewing source location and the coordinates that are computed (step 260).

For example, coordinates corresponding to a location of an element of an event 50 at a particular time may be computed by triangulation techniques based on images containing the element from multiple recording sources 44 at known recording locations at a single time, or by triangulation based on images from a single recording source 44 at known recording locations at different times. The speed and direction of movement of each recoding source 44 may be recorded along with other data (such as obtained, for example, by a compass and speedometer) or interpolated from the location data and time data of a recoding source. The speed and direction may also be obtained with a combination of recording and interpolating, or by other methods such as computed from video data relative to known surveillance objects (such as the spacing of dashed lines on a highway or other known markers). Although not strictly necessary, speed and direction data for each recording source 44 is helpful in computing coordinates of elements of an event 50.

Additional well-known techniques that may be employed include comparing a size of an element image recorded by a recording source 44 to a known element size. For example, if a car model is known, along with its height or length, then the distance of the car from a recording source 44 may be calculated based on image size and camera recording parameters.

Having computed coordinates locating elements of the event 50 allows generation of views from viewing source locations not co-located with the recording source 44 locations. For example, an overhead view of an accident scene may be generated even though all recording sources 44 are near the ground. As another example, a view source location may be determined to be in the location and direction of an automobile involved in an accident to recreate the driver's view.

Preferably, the coordinates of event elements are computed for a series of discrete times in which the event 44 is ongoing, so that the viewable reproduction may reproduce the event as a function of time, such as via well-known animation technologies. Depending on the locations of recording sources 44, actual recorded images of the event may not capture all desired information, for example, an accident on the side of a highway may likely only be captured by cars passing along the highway and not from a recording source away from the highway. In such cases, locations of non-recorded event elements may be extrapolated from known information, for example, cars tend to exhibit longitudinal symmetry, so a viewable reproduction of a side of a car not actually recorded may be generated by extrapolating coordinates in conformity with the side of the car actually recorded, and may further include knowledge such as dimensions acquired from the car manufacturer.

However, because the viewable reproduction will likely be used for investigative or evidentiary purposes, it is preferred that extrapolated portions be clearly identified as extrapolated, such as depicted in wireframe, or with surfaces of a designated color or colors. Alternatively, it may be desired that no extrapolated data be used, so that only actual recorded video image data is combined to generate the viewable reproduction. However, this technique may be confusing to viewers as portions of the event may appear or disappear as the recording sources 44 enter and leave the region of the event 50.

While the invention has been particularly shown and described with reference to the preferred embodiments thereof, it will be understood by those skilled in the art that the foregoing and other changes in form, and details may be made therein without departing from the spirit and scope of the invention. For example, although preferably surveillance data is captured as video data, the surveillance data may not be video data and instead be radar or sonar data captured as a result of passive or active radar or sonar operation.

What is claimed is:

1. A method for acquiring surveillance data corresponding to a region of interest comprising:
    installing a plurality of vehicle-mounted recording system on a plurality of vehicles;
    capturing visual data of exterior perimeters of the vehicles having vehicle-mounted recording systems when the vehicles are in motion wherein the visual data is marked with location data and time data;
    storing the visual data, the location data, and the time data so that each portion of the visual data is locatable by at least one of a time of video data capture and a location of video data capture;
    transmitting a polling request comprising information corresponding to the region of interest; and
    receiving a reply transmission to the polling request from at least one of the vehicle-mounted recording systems having recorded data corresponding to the polling request, the reply transmission to the polling request comprising information identifying said vehicle-mounted recording system, wherein receiving a reply transmission further comprises:
    acquiring first data from a first vehicle recording system, the first data comprising first visual data of exterior perimeter of a first vehicle;
    acquiring second data from a second vehicle recording source, said second data comprising second video data of exterior perimeter of a second vehicle; and
    synchronizing said first data and said second data in conformity with a first time data and a second time data; and
    generating a viewable reproduction of an event recorded by the first vehicle recording system and the second vehicle recording system.

2. The method of claim 1 further comprising transmitting the visual data, the location data, and the time data at a predetermine time interval to a data repository.

3. The method of claim 1 further comprising transmitting the visual data, the location data, and the time data at a predetermine time interval to a third party owned data repository.

4. The method of claim 1 further comprising storing the visual data, the location data, and the time data so that each portion of the visual data is locatable by at least one of a time of video data capture and a location of video data capture on a video recorder of the vehicle-mounted recording system.

5. The method of claim 1 further comprising the step of retrieving recorded surveillance data corresponding to at least a portion of the region of interest from one of the vehicle-mounted recording systems.

6. The method of claim 1 wherein receiving a reply transmission further comprises, receiving a reply transmission to said request, said reply transmission being transmitted by one of the vehicle-mounted recording systems within the region of interest, said reply transmission comprising information identifying the vehicle-mounted recording system; and transmitting the visual data of the exterior perimeter.

7. The method of claim 1 wherein generating a viewable reproduction of an event comprises:
    computing a plurality of coordinates corresponding to at least a portion of the event in conformity with the first video data, the second video data, the first location data, and the second location data;
    determining at least one viewing source location for the viewable reproduction; and displaying the viewable reproduction corresponding to the at least one viewing source location in conformity with the at least one viewing source location and the coordinates that are computed.

8. The method of claim 1 wherein installing a plurality of vehicle-mounted recording system on a plurality of vehicles further comprises:

installing a plurality of vehicle-mounted recording system, wherein each vehicle-mounted recording system comprises:

a memory for storing program instructions and data;

a processor coupled to the memory for executing the program instructions;

a camera coupled to the processor for capturing visual data, the camera movable to capture visual data in a 360° fashion as the vehicle moves;

locating device coupled to the processor for acquiring location data;

timing device coupled to the processor for acquiring time data; and an antenna coupled to the processor for sending and receiving transmissions;

wherein the program instructions comprise instructions for: storing the visual data, the location data, and the time data so that each portion of the visual data is locatable by at least one of a time of video data capture and a location of video data capture.

* * * * *